US006178172B1

(12) United States Patent
Rochberger

(10) Patent No.: US 6,178,172 B1
(45) Date of Patent: Jan. 23, 2001

(54) METHOD OF TOPOLOGY DATABASE SYNCHRONIZATION IN AN ASYNCHRONOUS TRANSFER MODE NETWORK

(75) Inventor: Haim Rochberger, Netanya (IL)

(73) Assignee: 3Com Corporation, Santa Clara, CA (US)

( * ) Notice: Under 35 U.S.C. 154(b), the term of this patent shall be extended for 0 days.

(21) Appl. No.: 09/047,068

(22) Filed: Mar. 24, 1998

(51) Int. Cl.[7] .............................. H04L 12/28; H04L 12/56
(52) U.S. Cl. .................................................. 370/395
(58) Field of Search .................................. 370/395, 254, 370/255, 235, 236, 237

(56) References Cited

U.S. PATENT DOCUMENTS

| | | | |
|---|---|---|---|
| 5,483,536 | * | 1/1996 | Gunji et al. ................. 370/85.14 |
| 5,550,818 | * | 8/1996 | Brackett et al. ................. 370/60 |
| 5,566,014 | * | 10/1996 | Glance ................. 359/124 |

OTHER PUBLICATIONS

Perlman, R., "Interconnections: Bridges and Routers", Addison–Wesley Publishing, Section 9.2.4, Chapter 9, pp. 205–264 (1992).*
Sedgewick, R., "Algorithms", Second Edition, Addison–Wesley Publishing, Chapter 17, pp. 245–257 (1988).*
Doeringer, W. et al., "Routing on Longest–Matching Prefixes", *IEEE/ACM Transactions on Networking*, vol. 4, No. 1, Feb. 1996, pp. 86–97.*
Williams, K. A., "A Distributed ATM Network Based on an Optical Passive Star", printed from website http://williams.cs.ncat.edu./ATMStar.htm, 2 pages, (1998).*
"All–optical ATM–Switch based on Self Electro–optic Effect Devices (SEED's)", printed from website http://www.stw.nl/projecten/T/tel3997.html, 2 pages, Feb. 2, 1997.*

* cited by examiner

*Primary Examiner*—Douglas W. Olms
*Assistant Examiner*—David R Vincent
(74) *Attorney, Agent, or Firm*—Howard Zaretsky; David J. Weitz; Wilson Sonsini Goodrich & Rosati

(57) ABSTRACT

A method for performing topology database synchronization between two nodes wherein one of the nodes is in an overload state. The node in the overload state looks for a neighboring node directly connected to it that is not in the overload state. After such a node is found, the link to the neighboring node is intentionally dropped and subsequently re-established. This causes the neighboring node to transfer its entire knowledge of the network to the node in the overload state. The node in the overload state than functions to forward the topology database information to its other neighboring node. In this fashion, the portions of the network one either side of the link learn about the other side notwithstanding the fact that one of the nodes is in an overload state. Once the database synchronization process is complete, calls can then be initiated from either side of the network to the other side.

9 Claims, 6 Drawing Sheets

METHOD OF TOPOLOGY DATABASE SYNCHRONIZATION IN AN ASYNCHRONOUS TRANSFER MODE NETWORK

FIELD OF THE INVENTION

The present invention relates generally to asynchronous mode transfer (ATM) networks and more particularly relates to a method of synchronizing a topology database while a node is in an overload state.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

As part of the ongoing enhancement to the ATM standard by work within the ATM Forum and other groups, the Private Network to Network Interface (PNNI) protocol has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

A high level block diagram illustrating the switching system reference model that the PNNI protocol is based on as shown in FIG. 1. The switching system, generally referenced 100, comprises a topology database 104 which interfaces with a topology data exchange module 106 within a route determination module 102. The topology data exchange module 106 communicates with neighboring nodes through a topology protocol. In addition, the switching system 100 communicates with a management entity via a management interface protocol. The switching system 100 also comprises a coprocessing module 124, a UNI signaling module 122 which communicates via a UNI signaling protocol, and a NNI signal module 126 which communicates via a NNI signaling protocol. In addition, the coprocessing module 124 interfaces to a switching fabric 130 which provides the switching functionality for the cell stream that is input and output to and from the switch 100.

The PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello message are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can reoriginate that PTSE. PTSEs are reissued both periodically and on an event driven basis.

A diagram illustrating the neighboring peer state machine describing the state of ongoing database synchronization and flooding with a neighboring node as shown in FIG. 2. As described previously, when a node first learns about the existence of a neighboring peer node which resides in the same peer group, it initiates the database exchange process in order to synchronize its topology database with that of its neighbor's. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

The conversation that occurs between two peers for purposes of database synchronization and flooding is described by the neighboring peer state machine shown in FIG. 2. A corresponding neighboring peer data structure is maintained by the nodes located on either side of the link. The neighboring peer data structure includes information required to maintain database synchronization and flooding to neighboring peers.

With reference to FIG. 2, it is assumed that both nodes on either side of the link begin in the Neighboring Peer Down state 140. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state 142 that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state 144 is entered. In this state the node describes is topology database to the neighboring peer by sending database summary packets to it.

After the peer processes the database summary packets, the missing or updated PTSEs can then be requested. In the Exchanging state 144 the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed is listed in one of the nodes database packets. PTSE's for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state 148.

However, if the PTSE request list is not empty then the Loading state 146 is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state 144 and the Loading state 146. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state 146 to the Full state 148. Once the Full state has been reached, the node has received all PTSEs known to be available from its neighboring peer and links to the neighboring peer can now be advertised within PTSEs.

A diagram illustrating a PNNI topology state packet (PTSP) comprising a polarity if PNNI topology state elements (PTSEs) is shown in FIG. 3. A PTSP is made up of one or more PTSEs sequentially placed one after another as shown in FIG. 3 labeled PTSE #1, PTSE #2 all the way through the final PTSE labeled PTSE #N.

However, a potential problem may arise during the operation of a PNNI protocol based ATM network. Since each node in the PNNI based ATM network holds the entire topology of the network, including that of its peer and hierarchies, if the network grows beyond a certain size the particular node can potentially run out of memory in which to hold the topology information. This is a problem as all the nodes in the network are constructed with a finite amount of memory. This memory is used to store and forward all the PTSEs received from neighboring nodes. If a node exhausts its memory either more memory must be added, i.e., the node upgraded, or the node must be taken out of operation and upgraded with a new node containing more memory.

Once a node determines that it has run out of memory, it is defined to be in overload state, meaning it lacks sufficient RAM for storing additional topology database information. A node in an overload state has limited switching capability and route calculations may or may not be possible. Even if routing is possible, it is not permitted in accordance with the PNNI-1 specifications. This is because it is not desirable to have a non-optimum route calculated due to the node's memory containing only a partial topology database thus making any route calculations potentially non-optimal. However, the node can function as a transit node which means it can function as a hop along the route for another node's routing list.

An overloaded node is a node that is in the overload state and, as mentioned above, cannot perform routing with the exception of local routing over direct connections to its local users. In response to entering the overload state, such a node generates and floods a PTSE which identifies itself as being in the overload state.

The prior art attempts to solve this problem include forcing the node in an overload state to advertise its condition to all other nodes, i.e., that the node is in the overload state. The node is also not permitted to function as a source node in calculating a source routing list for a path through the network to a non-local destination. The node is, however, permitted to function as a source node for routes that are local, i.e., connections to local users. In addition, in order to be removed from the overload state, must either be replaced with a node having more memory or modified so as to have additional memory installed in it.

Several problems exist with the prior art solutions described above. One, it is not always a simply procedure to replace or add memory to a node that already exists in the network. Such modifications typically are time consuming and thus entail taking a node down, i.e., out of service, for a certain time period. In addition, it is difficult and costly to replace switches that have been placed in operation most likely several years ago and which were constructed with less memory.

A second problem is described below in connection with FIG. 4 which is a high level block diagram illustrating an example ATM network having an unconnected left portion and an unconnected right portion making up a single peer. As shown in FIG. 4, a left portion 12 of peer A is unconnected to a right portion 14, also belonging to peer A. Both left and right portions comprising the example ATM network, generally referenced 10, are comprised of a plurality of nodes 16. For illustrative purposes, nodes X 22, Y 18 and Z 20 have been explicitly labeled. Nodes Y 18 and Z 20 are connected by a link referenced 29.

Let us now assume that nodes Y and X are connected by a communication link as shown in FIG. 5. It is also assumed that node Y is in an overload state, i.e., it comprises insufficient memory to hold a complete topology database describing the topology of the network 10. Thus, nodes X and Y, when connected by link 28, function in accordance with the state transition diagram shown in FIG. 2. At some point after negotiation is complete, both nodes begin exchanging database summary information as described previously above in connection with FIG. 2.

Under normal circumstances, with neither node Y nor X in an overload state, the two peers will attempt to synchronize their topology databases. Both nodes flood what each has learned about each other to their respective neighbors on the left and right portions of the network. Thus, within in a relatively short time, both the left and right portions will be able to route from a source on one end of the network to a destination on the other. This can occur after both nodes X and Y enter the Full state, meaning they have finished synchronizing their databases and have learned what each of the other node knows by its advertising the link to each of its corresponding neighbors. The term advertising denotes flooding when the message is sent out on all links attached to the node except for the link that the message came in on.

However, when one of the nodes is in an overload state, for example node Y in the example shown in FIG. 5, a problem arises when the overloaded node only has a portion of the knowledge of the topology of the network. Consequently, during the synchronization procedure when topology information is exchanged with node X, node Y can only give to node X that portion of the network topology that it has knowledge of. Thus, the right portion of peer A, through node X, will be flooded with only a partial representation of the left portion of the network. The part of the left portion of peer A that is not within node Y's topology database will eventually be flooded to the right portion of the network but only after the expiration of the refresh time-out of the corresponding PTSEs which may be minutes, hours or days depending on the setting within the particular node.

The nodes on the right portion of the network 14 that receive the limited topology database flooded from node Y are not aware that the topology information they receive is actually only partial and does not represent the complete topology of the left potion of the network 12. Thus routing lists calculated by nodes in the right portion of the network 14 will probably be non-optimum since they utilized a non-complete information about the topology of the network. These nodes are not aware that their route are non-optimum since they are not aware that the database information that was flooded is actually partial.

They are, however, aware that node Y is in an overload state since node Y has advertised this fact over links to its neighbors. As explained above, only after the PTSEs age out, which could take minutes, hours, or days, do the nodes finally get complete information about the network. Note, however, that the PTSEs from opposite sides of the link that were missing from the topology databases of the nodes expire at different times from each other.

An additional problem exists in transferring the topology information of the right portion of the network to the left portion of the network. Since node Y is in an overload state it cannot store what it learns from its new neighbor node X. Node Y, however, can teach or flood the topology of the right portion of the network to the nodes within the left portion of the network. Thus, all the nodes in the left portion of the network will learn about the right portion of the network with the exception of Node Y since it is in the overload state.

SUMMARY OF THE INVENTION

The present invention provides a solution to the disadvantages of the prior art discussed above. The present invention is a method for performing topology database synchronization between two nodes wherein one of the nodes is in an overload state. The node in the overload state looks for a neighboring node directly connected to it that is not in the overload state. If such a node is found, the link to the neighboring node is intentionally dropped and subsequently re-established. This causes the neighboring node to transfer its entire knowledge of the network to the node in the overload state. The node in the overload state than functions to forward the topology database information to its other new neighboring node. In this fashion, the portions of the network on either side of the link learn about the other side notwithstanding the fact that one of the nodes is in an overload state. Once the database synchronization process is complete, calls can then be initiated from either side of the network to the other side.

There is provided in accordance with the present invention, in an asynchronous transfer mode (ATM) network running the private network-to-network (PNNI) protocol, a method of synchronizing database information between a first node in an overload state connected by a first link to a neighboring second node not in an overload state, the method comprising the steps of prioritizing a topology database memory within the first node in response to the first node discovering it is in an overload state, initiating the hello protocol and associated finite state machine between the first node and the second node over the first link, choosing a neighboring third node connected to the first node that is not in an overload state, the third node connected to the first node via a second link, dropping the second link connecting the first node with the third node, re-establishing the second link so as to cause the first node and the third node to execute the hello protocol and associated finite state machine and exchanging database topology information between the second node and the third node by way of the first node which performs a forwarding function for the second node and the third node.

The step of choosing a neighboring third node comprises the step of choosing a neighboring third node in a random fashion from all nodes immediately neighboring the first node not in an overload state. The step of prioritizing a topology database memory does not comprise prioritizing PNNI topology state elements (PTSEs) about itself and those received from immediate neighbors. The step of dropping the second link comprises the step of transmitting a hello message to the third link with a remote node identification of zero.

There is also provided in accordance with the present invention, in an asynchronous transfer mode (ATM) network running the private network-to-network (PNNI) protocol, a method of synchronizing database information between a first node in an overload state connected by a first link to a neighboring second node not in an overload state, the method comprising the steps of prioritizing a topology database memory within the first node in response to the first node discovering it is in an overload state, initiating the hello protocol and associated finite state machine between the first node and the second node over the first link, choosing a neighboring third node connected to the first node that is not in an overload state, the third node connected to the first node via a second link, dropping the second link connecting the first node with the third node, re-establishing the second link so as to cause the first node and the third node to execute the hello protocol and associated finite state machine and performing exchange state protocol between the third node and the second node with the first node forwarding messages between the third node and the second node, performing load state protocol between the third node and the second node with the first node forwarding messages between the third node and the second node, entering the full state in the third node and the second node once database synchronization has completed between them.

The step of dropping the second link comprises the step of transmitting a hello message to the third link with a remote node identification of zero.

BRIEF DESCRIPTION OF THE DRAWINGS

The invention is herein described, by way of example only, with reference to the accompanying drawings, wherein:

FIG. 1 is a high level block diagram illustrating the switching system architecture model that the PNNI protocol is based on;

DETAILED DESCRIPTION OF THE INVENTION

Notation Used Throughout

The following notation is used throughout this document.

| Term | Definition |
| --- | --- |
| ATM | Asynchronous Transfer Mode |
| DS | Database Summary |
| FSM | Finite State Machine |
| ITU | International Telecommunications Union |
| NNI | Net to Network Interface |
| PNNI | Private Network to Network Interface |
| PTSE | PNNI Topology State Element |
| PTSP | PNNI Topology State Packet |
| RCC | Routing Control Channel |
| UNI | User to Network Interface |
| VCC | Virtual Channel Connection |

General Description

Figure 1:
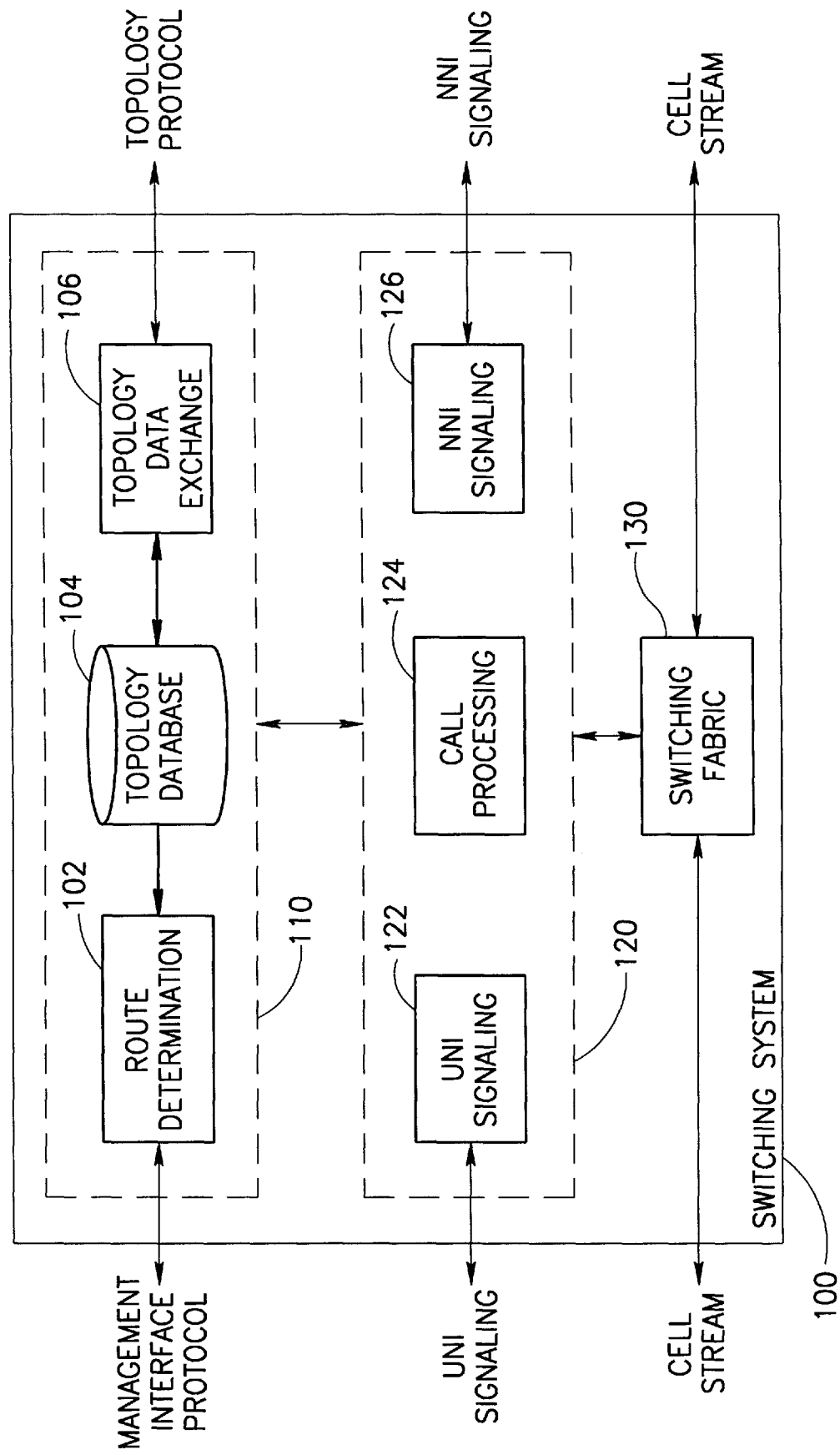
Figure 2:
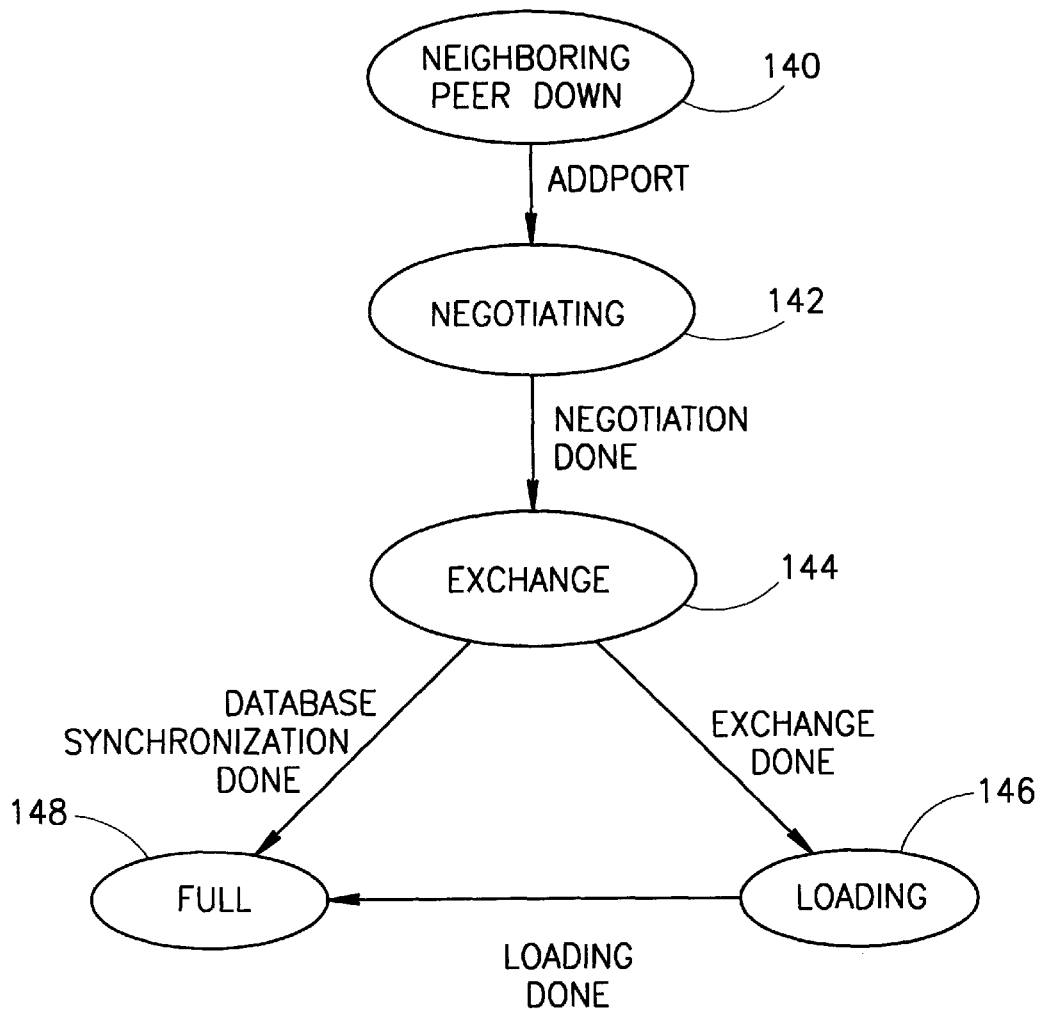
FIG. 2 is a diagram illustrating the neighboring peer state machine which describes the state of ongoing database synchronization and flooding with the neighboring node.
Figure 3:
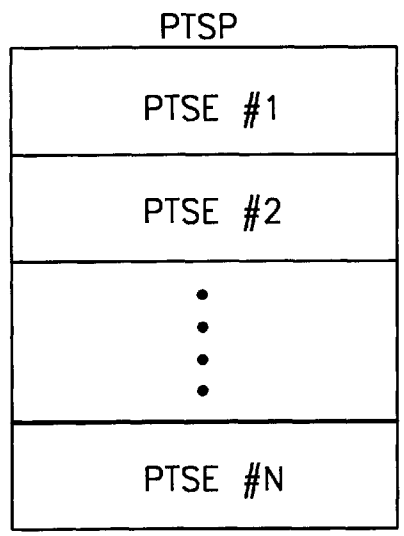
FIG. 3 is a diagram illustrating a PNNI Topology State Packet (PTSP) comprising a plurality of PNNI Topology State Elements (PTSEs)
Figure 4:
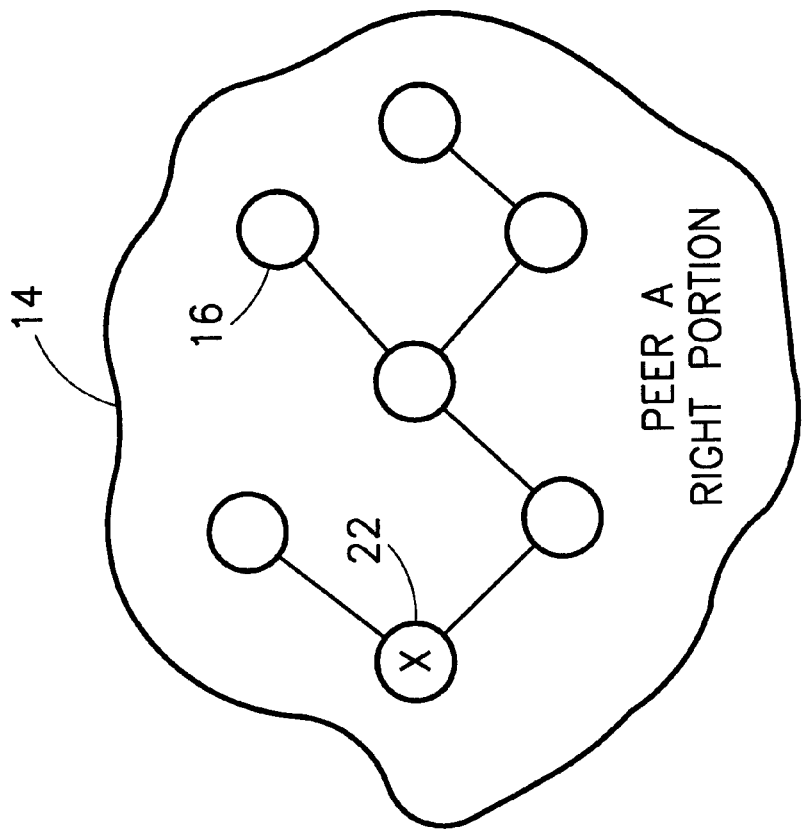
FIG. 4 is a high level block diagram illustrating an example ATM network having an unconnected left portion and a right portion making up a peer.
Figure 4:
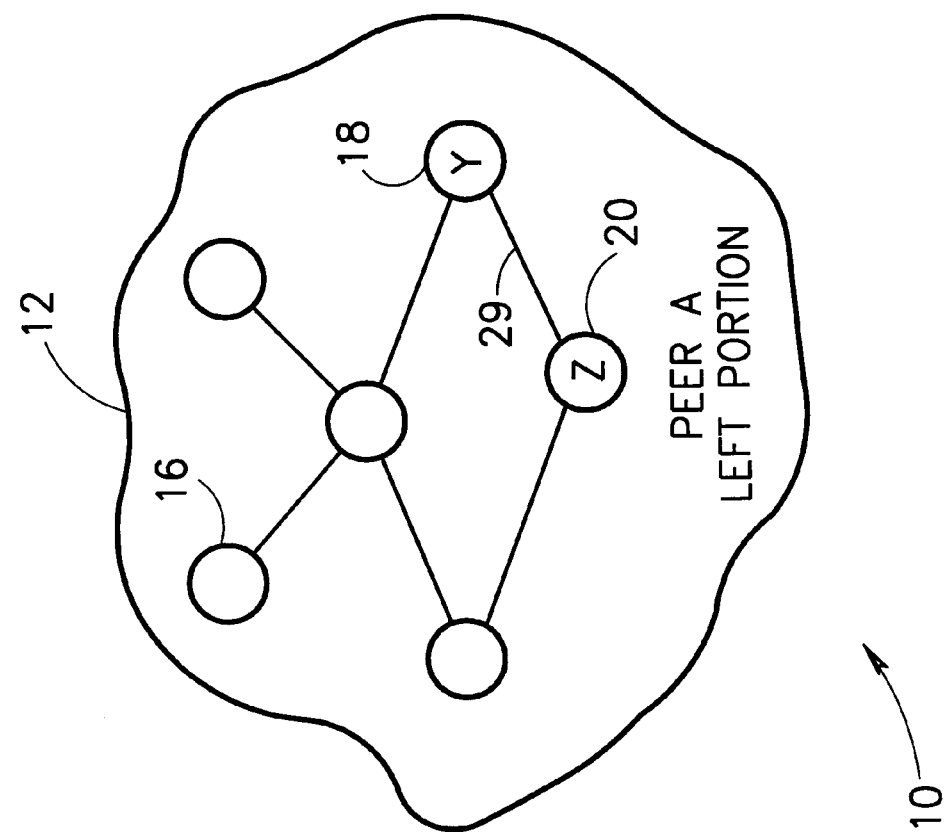
Figure 5:
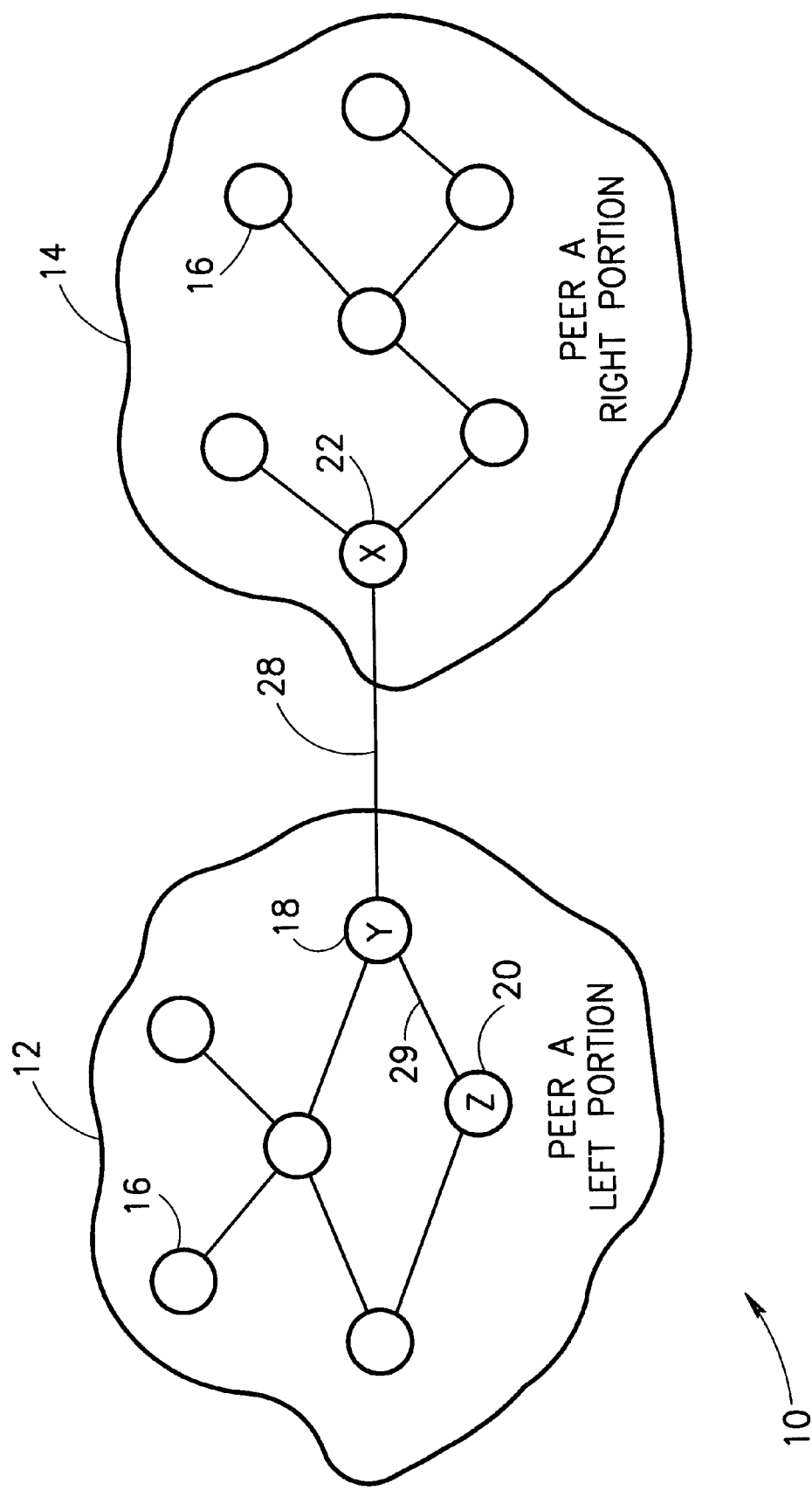
FIG. 5 is a high level block diagram illustrating an example ATM network having a connected left portion and a right portion constituting a peer.

The present invention is a method that permits a node in the overload state to perform a topology database synchronization with its neighbor node on the other side of a communication link. The principle of the present invention is to have the node in the overload state (node Y in FIG. 5) appear as a pipe or conduit through which topology database information can flow to its neighbors. Thus, although the node in the overload state cannot store the topology information received from its neighboring node across the link, it functions as a conduit for transferring the topology information to other nodes connected to the node in the overload state.

Figure 6:
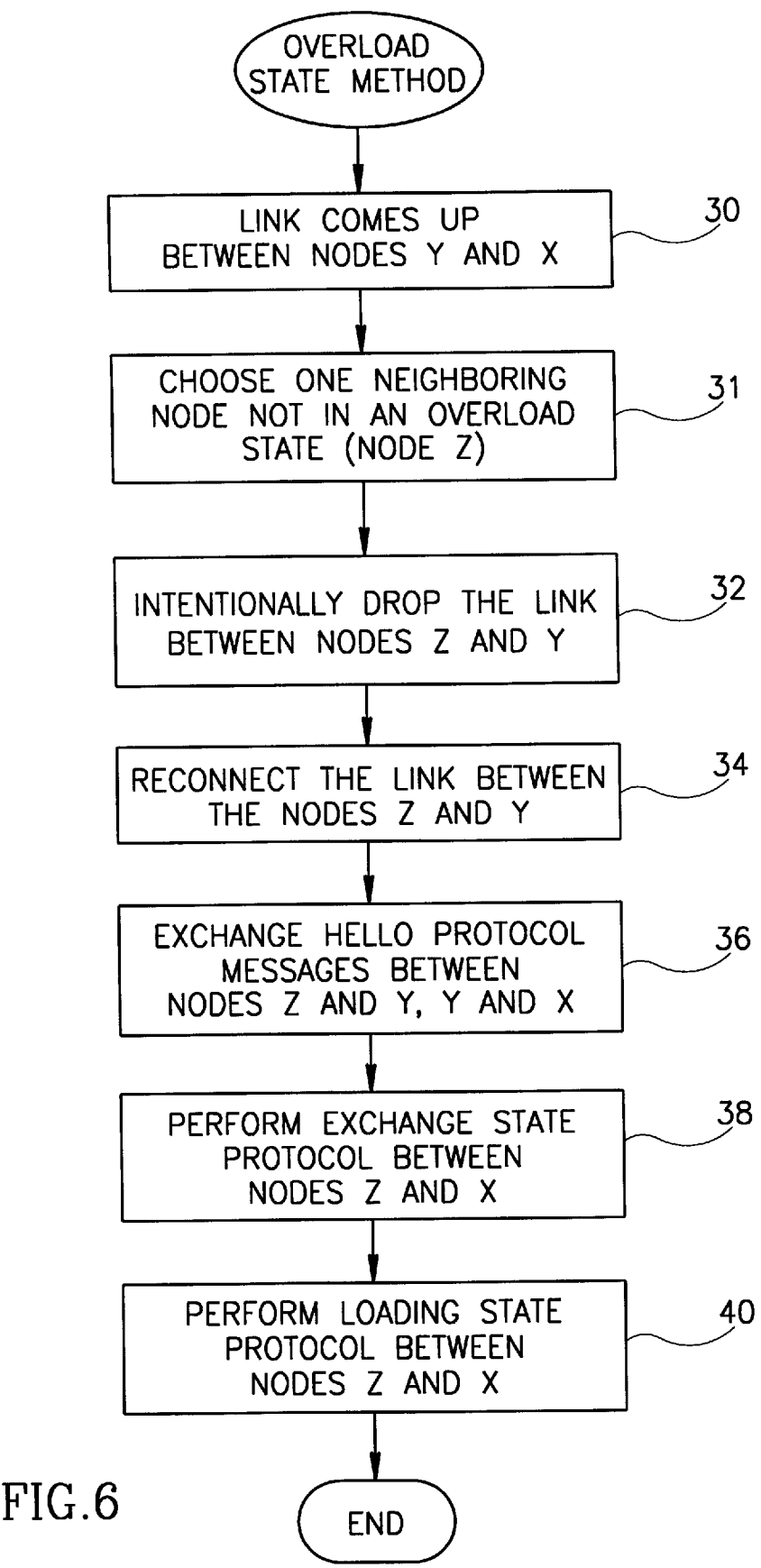
FIG. 6 is a high level flow diagram illustrating the method of synchronizing topology database information with a node in the overload state.

A high level flow diagram illustrating the method of synchronizing topology database information with a node that is in the overload state is shown in FIG. 6. The trigger for the method is the link between the two peer portions of the network coming up (step 30). Once the link comes up, the node in the overload state, i.e., node Y, looks at its neighbors directly connected to it and in a random fashion chooses one node, e.g., node Z, that is not in the overload state (step 31). Note that a node has knowledge of which of its neighbors are in an overload state since that node would have flooded a PTSE advertising to that effect. The purpose of this step is that node Y chooses a neighboring node that has full knowledge of the network, in this example, knowledge of the left portion of the network.

The next step of the method is to intentionally drop the link connecting the node in the overload state, i.e., node Y, to its neighboring node not in the overload state, i.e., node Z, (step 32). This can be achieved by sending a Hello message with a remote node ID of zero. In this state, the node in the overload state (node Y) prioritizes its memory of all PTSE information. PTSE information received locally, i.e., from an immediate neighbor, is given priority over PTSE information received from a non-local node. Thus, if a node is in the overload state, and a local PTSE is received, the node will free up memory to make room in its database for the PTSE data form the local node. PTSE information comprises, but is not limited to, node PTSEs, IDs, node capacities, addressing information and links and ports to neighbors. Once the node in the overload state, i.e., node Y, intentionally drops the link between it and node X, the Hello protocol is reinitiated on the link.

In the next step, the link 28, connecting node Y and node X, is brought back up and the Hello protocol begins to run (step 34). Eventually, the neighboring peer process Finite State Machine (FSM) arrives at a state where the database summary information is passed between the nodes. At this point, the synchronization data (PTSE header information) and exchange data (missing PTSEs) are exchanged (step 38). Note that node Y in this example has selected node Z since node Z has not advertised that it is in the overload state. This means that a node in an overload state must keep the PTSE it receives from a neighbor indicating that the neighbor in an overload state. The overload state PTSE is kept even at the expense of freeing some other portion of the topology database within its limited memory capacity. An overload state PTSE comprises a nodal PTSE having a bit indicating that that particular node is in the overload state. During the Exchanging and Loading states, nodes on both sides of the link will forward what it learns from the neighbor directly to the other neighbor. This occurs notwithstanding the fact that node Y cannot store the data it receives locally.

Thus, when communication link 28 comes up, node Y will intentionally drop link 29 connecting it to node Z. At this point, node Y participates in a synchronization process on two links 28 and 29 at the same time. Note that node Y selected node Z since it knows that node Z is not in an overload state since it would have advertised this fact. The PTSE information received from node Z is not stored locally on node Y but is transferred or forwarded to node X. Similarly, PTSE information received by node Y from node X is forwarded to node Z and not stored locally.

At the end of the database synchronization process, which can take a few seconds in the worst case typically, both left and right portions of the peer A network will know everything about each other since the nodes not in the overload state will flood what they have learned in the usual fashion in accordance with the PNNI-1 standard. After this occurs, calls can then be established from both left to right and from right to left parts of the network. It is important to note that absent the method of the present invention, the nodes having only partial knowledge of the topology of the network can cause numerous crankbacks on both left and right portions due to the incomplete knowledge of the network.

Figure 7:
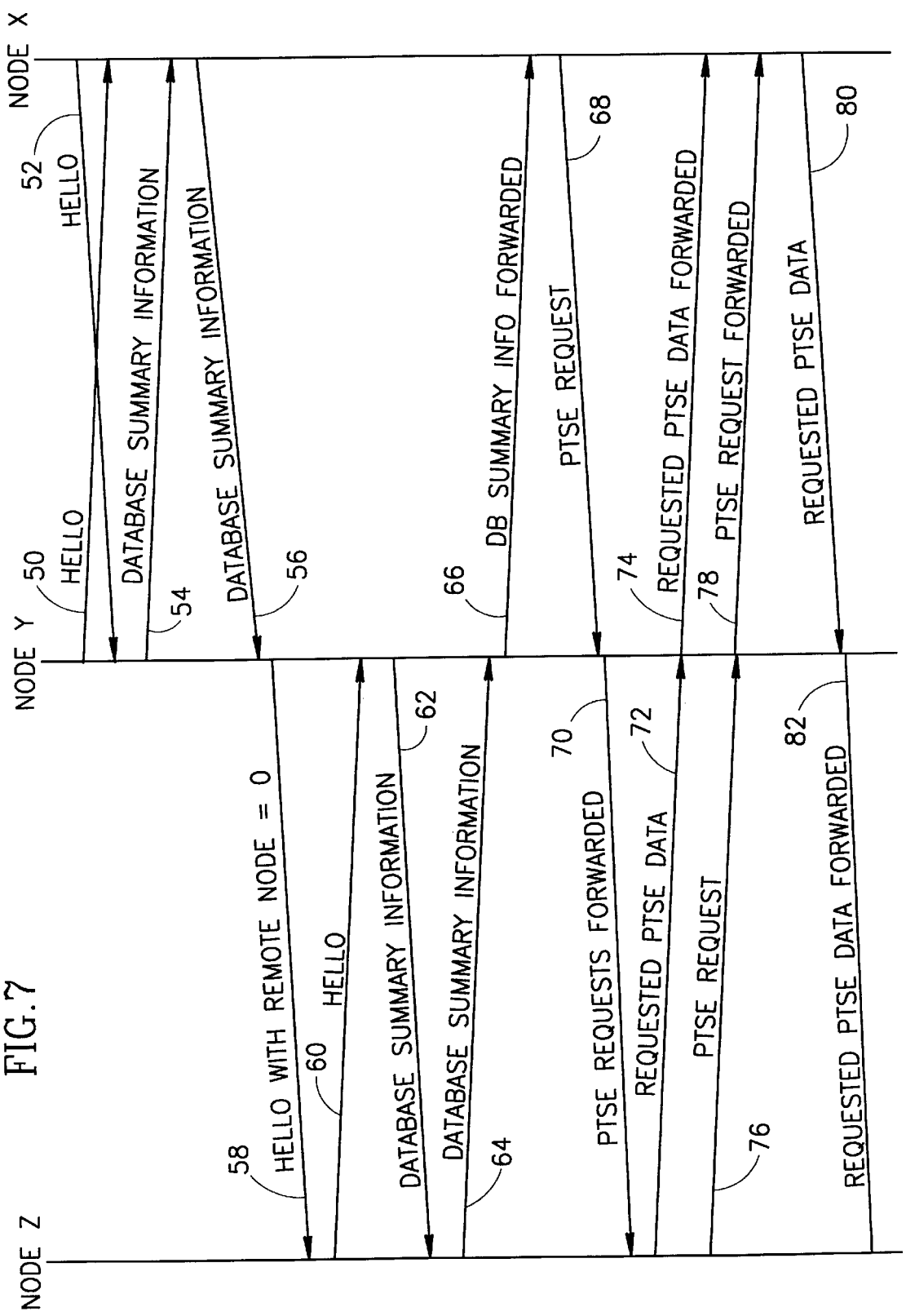
FIG. 7 is a diagram illustrating the message flow between the node in an overload state and two of its neighboring nodes.

A diagram illustrating the message flow between the node in an overload state and two of its neighboring nodes is shown is FIG. 7. Represented in FIG. 7 are node Z which is not in an overload state, node Y which is in an overload state and node X which is also not in an overload state. With reference to FIGS. 6 and 7, when link 28 first comes up nodes Y and X begin the hello protocol (arrows 50 and 52).

At this point since node Y knows that it is in an overload state it chooses one of its neighbors that is not in its overload state, for example node Z, and intentionally drops the link between them, i.e., the link 29 between it and node Z. Both node Y and node X then begin to exchange database summary information (arrows 54 and 56). Node Y drops the link to node Z by sending a Hello message to node Z with a remote node ID of zero (arrow 58). Node Z then sends a Hello message to node Y (arrow 60). At that point, node Y sends database summary information to node Z that it received from node X (arrow 62). Node Z then sends database summary information to node Y (arrow 64). Node Y in, turn, forwards the database summary information to node X (arrow 66).

In response to the database summary information received, node X forwards a PTSE request list to node Y (arrow 68). Node Y then forwards the PTSE request list received from node X to node Z (arrow 70). Node Z then sends the requested PTSE data (arrow 72) to node Y which forwards it to node X (arrow 74).

In addition, node Z sends its PTSE request list (arrow 76) to node Y which forwards it to node X (arrow 78). In response, node X responds with the requested PTSE data (arrow 80) and sends it to node Y. Node Y in turn forwards the requested PTSE data (arrow 82) to node Z. Thus, in this fashion, node X learns about the complete topology of the left portion of peer A and node Z learns about the complete network topology information on the right portion of peer A. All the nodes on the left portion of peer A will eventually be flooded with the complete topology information via node Z. Likewise, nodes on the right portion of peer A will be flooded via node X with the topology information on the left portion of the network. Once this occurs calls can be established from a source user on either side to a destination user on the opposite side.

While the invention has been described with respect to a limited number of embodiments, it will be appreciated that many variations, modifications and other applications of the invention may be made.

What is claimed is:

1. In an asynchronous transfer mode (ATM) network running the private network-to-network (PNNI) protocol, a method of synchronizing database information between a first node in an overload state connected by a first link to a neighboring second node not in an overload state, said method comprising the steps of:

prioritizing a topology database memory within said first node in response to said first node discovering it is in an overload state;

initiating the hello protocol and associated finite state machine between said first node and said second node over said first link;

choosing a neighboring third node connected to said first node that is not in an overload state, said third node connected to said first node via a second link;

dropping said second link connecting said first node with said third node;

re-establishing said second link so as to cause said first node and said third node to execute the hello protocol and associated finite state machine; and exchanging database topology information between said second node and said third node by way of said first node which performs a forwarding function for said second node and said third node.

2. The method according to claim 1, wherein said step of choosing a neighboring third node comprises the step of choosing a neighboring third node in a random fashion from all nodes immediately neighboring said first node not in an overload state.

3. The method according to claim 1, wherein said step of prioritizing a topology database memory comprises the step of giving priority over PTSE information from a local node over PTSE information from a non-local node.

4. The method according to claim 1, wherein said step of dropping said second link comprises the step of transmitting a hello message to said third link with a remote node identification of zero.

5. In an asynchronous transfer mode (ATM) network running the private network-to-network (PNNI) protocol, a method of synchronizing database information between a first node in an overload state connected by a first link to a neighboring second node not in an overload state, said method comprising the steps of:

prioritizing a topology database memory within said first node in response to said first node discovering it is in an overload state;

initiating the hello protocol and associated finite state machine between said first node and said second node over said first link;

choosing a neighboring third node connected to said first node that is not in an overload state, said third node connected to said first node via a second link;

dropping said second link connecting said first node with said third node;

re-establishing said second link so as to cause said first node and said third node to execute the hello protocol and associated finite state machine; and performing exchange state protocol between said third node and said second node with said first node forwarding messages between said third node and said second node;

performing load state protocol between said third node and said second node with said first node forwarding messages between said third node and said second node;

entering the full state in said third node and said second node once database synchronization has completed between them.

6. The method according to claim 5, wherein said step of choosing a neighboring third node comprises the step of choosing a neighboring third node in a random fashion from all nodes immediately neighboring said first node that is not in an overload state.

7. The method according to claim 5, further comprising the step of prioritizing the topology database memory within said first node in response to said first node discovering it is in an overload state.

8. The method according to claim 5, wherein said step of prioritizing a topology database memory comprises the step of giving priority to PTSE information from a local node over PTSE information from a non-local node.

9. The method according to claim 5, wherein said step of dropping said second link comprises the step of transmitting a hello message to said third link with a remote node identification of zero.

* * * * *